(12) United States Patent
Li et al.

(10) Patent No.: US 11,668,851 B2
(45) Date of Patent: Jun. 6, 2023

(54) SYSTEMS AND METHODS FOR DETERMINING TUBING DEVIATIONS

(71) Applicant: Baker Hughes Oilfield Operations LLC, Houston, TX (US)

(72) Inventors: Baoyan Li, Houston, TX (US); Marc Ramirez, Houston, TX (US); Peng Yuan, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 26 days.

(21) Appl. No.: 17/200,001

(22) Filed: Mar. 12, 2021

(65) Prior Publication Data

US 2022/0291413 A1 Sep. 15, 2022

(51) Int. Cl.
*G01V 5/10* (2006.01)
*G01V 5/04* (2006.01)

(52) U.S. Cl.
CPC ............ *G01V 5/045* (2013.01); *G01V 5/108* (2013.01)

(58) Field of Classification Search
CPC ........ G01V 5/105; G01V 5/101; G01V 5/104; G01V 5/108; G01V 5/045
See application file for complete search history.

(56) References Cited

U.S. PATENT DOCUMENTS

| | | | | |
|---|---|---|---|---|
| 5,235,185 A | * | 8/1993 | Albats ................... | G01V 5/105 250/269.5 |
| 5,699,246 A | * | 12/1997 | Plasek .................... | G01V 11/00 175/50 |
| 2009/0210161 A1 | * | 8/2009 | Duenckel ............... | G01V 5/101 702/8 |
| 2016/0047941 A1 | * | 2/2016 | Mauborgne ............ | G01V 5/045 250/261 |
| 2016/0327680 A1 | | 11/2016 | Jain | |
| 2017/0108611 A1 | | 4/2017 | Vasquez | |
| 2020/0116891 A1 | | 4/2020 | Inanc | |

OTHER PUBLICATIONS

International Search Report and Written Opinion dated Jun. 22, 2022 in corresponding PCT Application No. PCT/US22/19862.

* cited by examiner

*Primary Examiner* — David P Porta
*Assistant Examiner* — Fani Polyzos Boosalis
(74) *Attorney, Agent, or Firm* — Hogan Lovells US LLP (57) ABSTRACT

A method for determining a tubing deviation from nuclear measurement data includes acquiring neutron measurement data from a wellbore. The method also includes identifying one or more features from the neutron measurement data. The method further includes determining, based at least in part on a pattern matching algorithm, that the one or more features are indicative of a tubular deviation. The method also includes determining, based at least in part on a comparison between the one or more features, a deviation amount.

20 Claims, 8 Drawing Sheets

SYSTEMS AND METHODS FOR DETERMINING TUBING DEVIATIONS

BACKGROUND

1. Field of the Disclosure

The present disclosure relates to systems and methods for downhole measurements, and in particular, to systems and methods for tubing eccentricity detection.

2. Description of Related Art

Wellbore operations may deploy one or more measurement modalities in order to interrogate and evaluate properties of a formation. For example, multiple measurement modalities may be used to evaluate wellbore integrity, obtain formation properties, and the like. One measurement relates to evaluations of tubing eccentricity, which may affect subsequent downhole measurements. Traditionally, electromagnetic tools (EM) tools are utilized to perform eccentricity measurements. Evaluations that only use one tool or tool type may be subject to errors and a lack of quantitative comparison, which may lead to subsequent errors when different measurement modalities are deployed.

SUMMARY

Applicant recognized the limitations with existing systems herein and conceived and developed embodiments of systems and methods, according to the present disclosure, for pattern recognition techniques using neutron measurements.

In an embodiment, a method for determining a tubing deviation from nuclear measurement data includes acquiring neutron measurement data from a wellbore. The method also includes identifying one or more features from the neutron measurement data. The method further includes determining, based at least in part on a pattern matching algorithm, that the one or more features are indicative of a tubular deviation. The method also includes determining, based at least in part on a comparison between the one or more features, a deviation amount.

In an embodiment, a method for determining a deviation from nuclear measurement data includes receiving a first data set, the first data set including first time domain spectrum measurements with a first set of bins corresponding to respective known deviated positions. The method also includes receiving a second data set, the second data set including second time domain spectrum measurements with a second set of bins corresponding to respective unknown deviated positions. The method further includes determining, from the first data set, a first response pattern for the respective known deviated tubing positions. The method also includes determining, from the second data set, a second response pattern for the respective unknown deviated positions. The method further includes determining, based at least in part on the first response pattern and the second response pattern, a cross correlation coefficient between the first response pattern and the second response pattern. The method includes determining, based at least in part on the cross correlation coefficient, respective deviations for the respective unknown deviated positions.

In an embodiment, a system for determining a tubing deviation within a wellbore includes a neutron generator forming at least a first portion of a downhole tool, an array of neutron detectors forming at least a second portion of a downhole tool, and a control system. The control system includes a memory and a processor, the processor storing instructions that, when executed by the processor, cause the processor to acquire neutron measurement data from a wellbore. Additionally, the instructions, when executed, cause the processor to identify one or more features from the neutron measurement data. The instructions, when executed, cause the processor to determine, based at least in part on a pattern matching algorithm, that the one or more features are indicative of at least one of a tool or a tubular deviation. Also, the instructions, when executed, cause the processor to determine, based at least in part on a comparison between the one or more features, a deviation amount.

BRIEF DESCRIPTION OF DRAWINGS

The present technology will be better understood on reading the following detailed description of non-limiting embodiments thereof, and on examining the accompanying drawings, in which.

DETAILED DESCRIPTION

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose. Additionally, references numerals may be reused for similar features between figures, however, such use is not intended to be limiting and is for convenience and illustrative purposes only.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure are directed toward systems and methods for detecting tubing eccentricity, which may also be referred to as tube and/or tubular deviation. In various embodiments, the systems and methods may incorporate a new robust pattern recognition technique for detecting the tubing eccentricity with noisy neutron measurements. The proposed method is applicable for both fresh and mature cased-hole wells. Determination of tubing (e.g., tubular) eccentricity is important for accurate and reliable data processing of logging through tubing. Eccentricity may play a role in tool responses, such as for neutron, gamma ray, acoustic, and electromagnetic (EM) tools. Conventionally, tubing eccentricity has been determined with responses of EM tools. In addition, the consistency of responses of different tools to the tubing eccentricity is qualitatively checked. However, the quantitative comparison of the tubing position estimated from different tools is useful for data quality control of logs, borehole environment corrections of tool responses, and integrations of logs of different modalities. Present systems do not enable this quantitative comparison.

As noted, conventional techniques for determining eccentricity involve using EM tools. However, different measurement modalities may be utilized and it may be desirable to use those modalities to conduct and/or verify eccentricity measurements. One such example is with neutron measurements. A challenge with using neutron measurements is that neutron measurements have intrinsic random errors. Particularly, multiple borehole environmental factors have effects on neutron tool responses, such as borehole fluids, formation fluids, cement defects, borehole size, formation composition, formation porosity, formation saturations, tubing position, and the like. As a result, it is difficult to isolate the effect on the neutron tool responses directly, caused by the tubing eccentricity. Embodiments of the present disclosure overcome these problems by utilizing a pattern recognition method to detect the tubing eccentricity with measurements from a neutron tool, which are inherently of low fidelity. The pattern responses of a neutron tool to the eccentricity of the tubing are extracted from the measurements of a neutron tool at the known deviated tubing positions. The extracted pattern responses of neutron measurements for the unknown tubing positions are matched with the pattern responses of the neutron tool at known tubing deviation positions to search for the solutions of the unknown tubing positions. Embodiments may be used with both fresh and mature wells to provide a robust and efficient method to identity the tubing eccentricity. The extracted pattern responses of the neutron tool make the tubing position become its unique dominant factor to enhance the accuracy of the determined tubing eccentricity.

Figure 1:
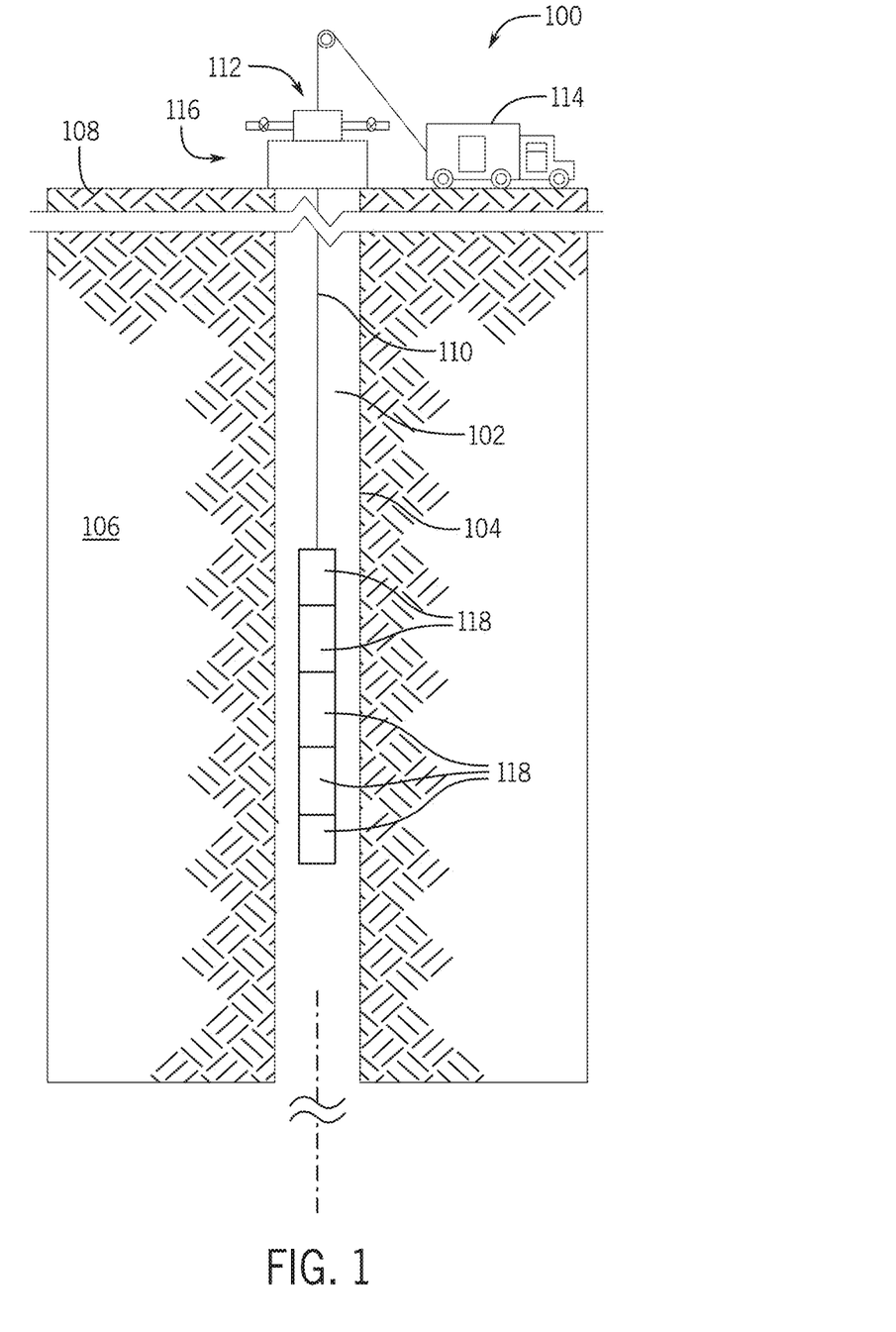
FIG. 1 is a cross-sectional side view of an embodiment of an wellbore system, in accordance with embodiments of the present disclosure.

FIG. 1 is a schematic cross-sectional view of an embodiment of a wellbore system 100 including a downhole tool 102 arranged within a wellbore 104 formed in a formation 106. The downhole tool 102 is lowered from a surface location 108 via a conveyance system, such as the illustrated wireline 110. In various embodiments, the electric wireline may transmit electric signals and/or energy from the surface location 108 into the wellbore, for example to provide operational power for the tool 102 and/or to transmit data, such as data obtained from sensors arranged on the tool 102.

In various embodiments, the tool 102 may be utilized to perform downhole logging operations, such as an imaging tool, a resistivity tool, a nuclear magnetic resonance tool, or any other logging tool that may be used in a downhole environment. It should be appreciated that embodiments exist where the downhole tool 102 is deployed with any other type of conveyance means, including coiled tubing, pipes, cable, and slickline. That is, embodiments of the present disclosure may be utilized in other scenarios, such as measurement while drilling, production logging, and the like.

The wellbore system 100 includes a wellhead assembly 112, shown at an opening of the wellbore 104, to provide pressure control of the wellbore 104 and allow for passage of equipment into the wellbore 104, such as the cable 110 and the tool 102. In this example, the cable 110 is a wireline being spooled from a service truck 114. The wellhead assembly 112 may include a blowout preventer (BOP) 116 (e.g., pressure control device).

In various embodiments, the downhole tool 102 includes a number of segments 118, which may represent different devices or sensors utilized to obtain information from the downhole environment. By way of example only, one segment may relate to a nuclear detection tool that may include one or more radiation sources and detectors to receive signals corresponding to radiation emitted from the formation. The radiation may be naturally occurring or in response to interrogation from the source. The tools associated with these segments 118 may be utilized to determine one or more properties of the formation 106 and/or identify specific features of the wellbore, such as properties of the tubing and/or casing.

In the illustrated embodiment, the tool 102 is deployed on the wireline 110 and may be transitioned through the wellbore 104 via gravity. While the illustrated wellbore 104 is shown as being substantially straight (e.g., straight up and down) it should be appreciated that wellbores may be deviated or have geometric differences along their length. As the tool 102 descends along the wellbore 104, various factors may cause the tool 102 to misalign with an axis of the wellbore 104. In other words, the tool 102 may be eccentric with respect to the well. This configuration may distort or otherwise impede data collection. These effects may also be seen when tubing is deviated, such as deviated casing or tubing sections along the wellbore 104. In these situations, cement may be thicker at certain portions of the well due to tubular or casing alignment, which may affect downhole measurements. For example, thicker cement may lead to greater attenuation. As will be described herein, embodiments of the present disclosure may be utilized to detect features associated with a neutron response. The features may be evaluated over a specific time domain in order to identify feature responses that are controlled or otherwise dominated by the presence of tool and/or tubular eccentricity. These features may be evaluated and identified via a cross correlation coefficient to determine an offset of the tool and/or tubular, thereby providing information that may be used to correct or adjust downhole measurements.

Figure 2A:
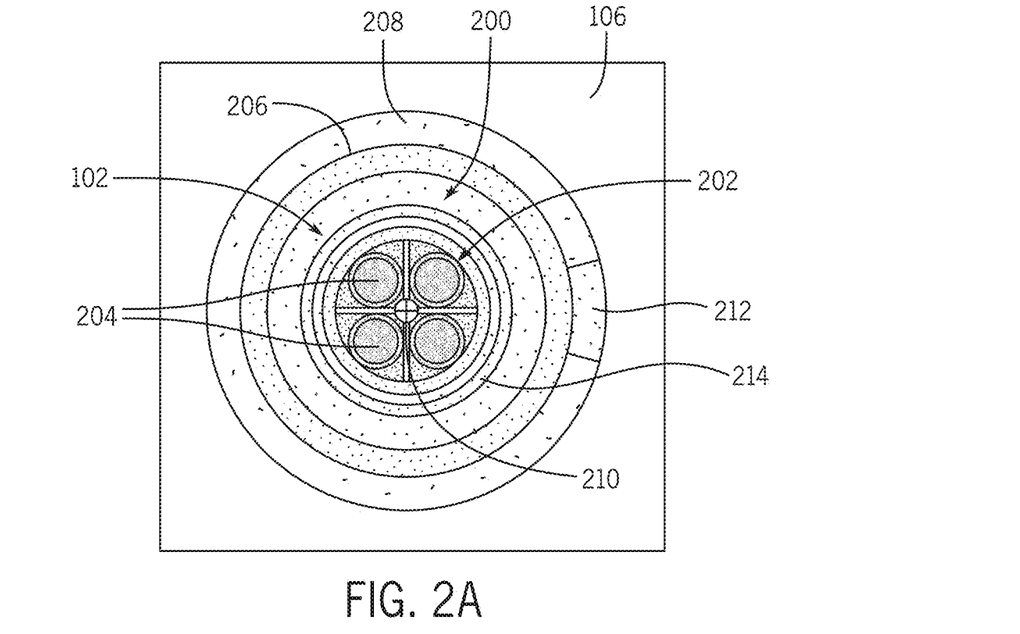
FIGS. 2A-2D are cross-sectional top views of embodiments of a wellbore tool arranged within a wellbore, in accordance with embodiments of the present disclosure.
Figure 2B:
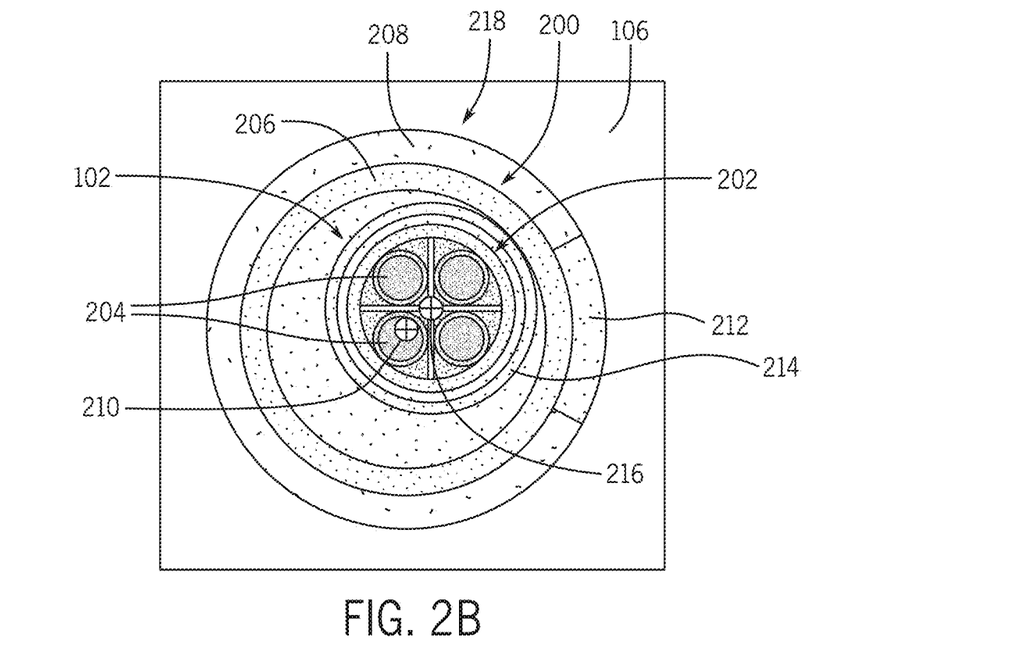

FIGS. 2A and 2B are top cross-sectional views of embodiments of the downhole tool 102 illustrating portions of a nuclear measurement system 200, including an array 202 of detectors 204 positioned to receive and detect neutrons emitted from the formation 106. In the illustrated embodiment, the detectors 204 are positioned to provide azimuthal sensitivity over four different quadrants. It should be appreciated that systems and methods of the present disclosure may include more or fewer detectors 204 and that the present disclosure of four detectors arranged in quadrants is for illustrative purposes only.

FIG. 2A illustrates the tool 102 arranged within the wellbore 104 (FIG. 1) that includes a tubular 206 (e.g., tubing), which may be casing or an intermediate tubular. The tubular 206 may be secured to the formation 106, for example, via a layer of cement 208. The tubular 206 is arranged along an axis 210 (perpendicular to the plane of the page) and in FIG. 2A the tubular 206 is substantially centered or otherwise concentric within the wellbore. Additionally, in this example, the tool 102 is substantially aligned with the axis 210. The tool 102, along with the tubing 206, may be described as being concentric or coaxially aligned with the axis 210. Accordingly, measurement information from the tool 102 should be substantially equal, but for the inclusion of defects 212, such as the damaged cement illustrated in FIG. 2A. Embodiments of the present disclosure may be utilized to determine tubing eccentricity. In various embodiments, the tool 102 will be arranged within an intermediate or secondary tubular or tubing 214. The intermediate tubing 214 may correspond to a tubing arranged within the tubular 206. As shown in FIGS. 2A and 2B, the tool 102 is centralized within the tubing 214. Accordingly, as will be described below, tubing eccentricity (e.g., eccentricity of the tubing 214 and/or the tubular 206) may be determined in various embodiments.

In contrast, FIG. 2B illustrates an eccentric position of the tool 102, where a tool axis 216 is not concentric or coaxial with the axis 210, which also corresponds to an eccentricity of the tubular 214 due to the centralized arrangement of the tool 102 within the tubing 214. In this embodiment, the tool 102 is closer to the tubular 206 in a first region 218. That is, an upper right quadrant of the tubular 206 may be closer to the tool 102 than other quadrants of the tubular 206. As a result, data acquired by the detectors 204 may be affected by the position of the tool 102. That is, the eccentricity may be a "dominant" or "control" factor of the measurement data, which may, in certain embodiments, provide information that may be improperly identified as a defect or other wellbore property. It should also be appreciated that the tubing deviation can cause count rate changes of all detectors, compared with those for the centralized tubing position, and not just to particular detectors of detector arrays that may be closer to the wellbore.

Embodiments of the present disclosure are directed toward identifying eccentricity of the tool 102 (which may correspond to eccentricity of the tubing 214 when the tool 102 is centralized within the tubing 214) and/or tubular 206 by evaluating data responses from the detector 204 for features indicative of eccentricity. For example, the tool 102 is confined to the tubing 214, and as a result, the tubing position will control the tool 102 in various embodiments. When the tool 102 (e.g., tubular 214) is arranged closer to the tubular 206, there may be fewer hydrogen atoms between the tool 102 and the tubular 206, which may affect measurements. Furthermore, there may be less attenuation or material between the tubular 206 and the tool 102. Embodiments are directed toward identifying features indicative of the eccentricity and applying one or more cross correlation coefficients in order to detect for the position of the tool 102 and/or tubular 206.

Figure 2C:
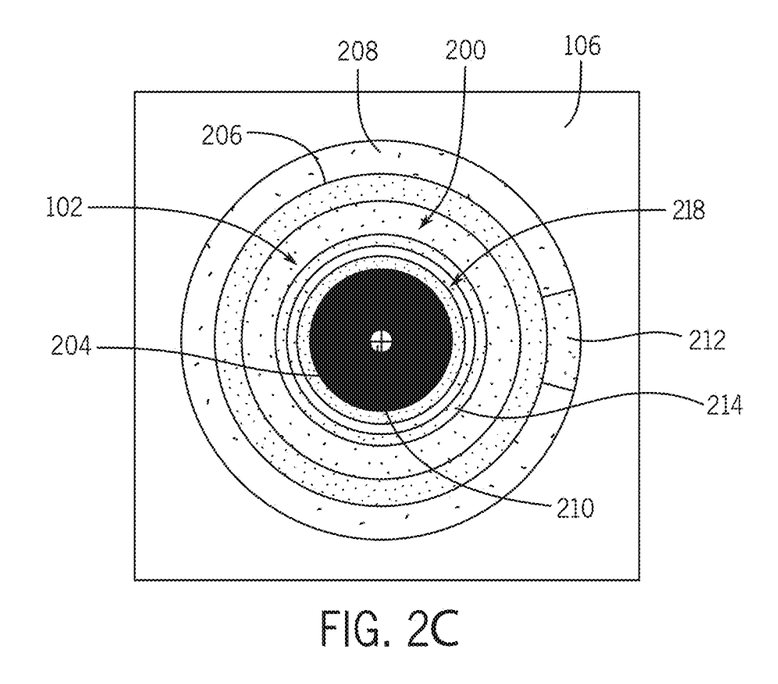
Figure 2D:
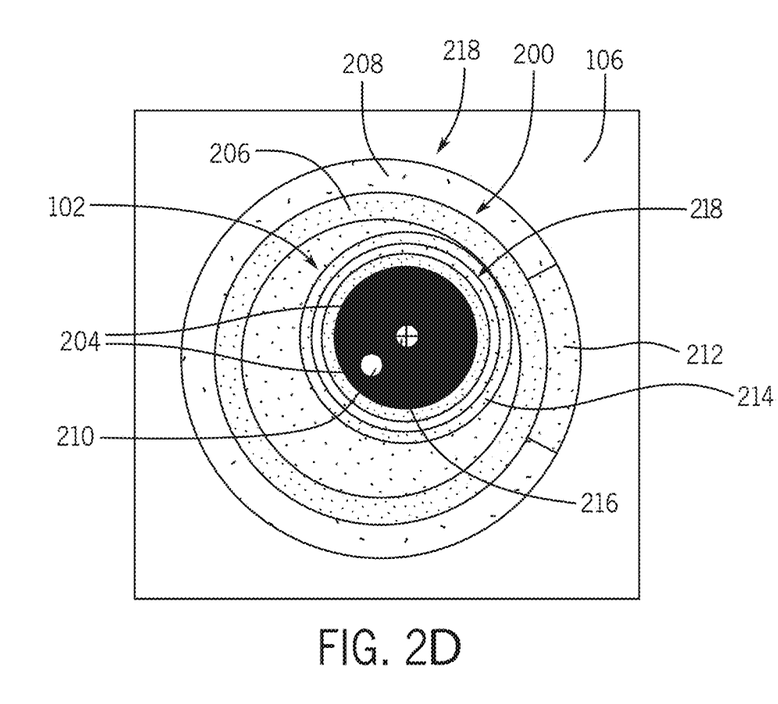

It should be appreciated that various embodiments of the present disclosure may be utilized in systems that include one or more neutron detectors 204. In certain embodiments, the array 202 may be replaced with a single detector 204, which may be collimated to create an azimuthal sensitivity. Furthermore, one or more of the detector or source may be collimated to gain spatial localization. FIGS. 2C and 2D illustrate the tool 104 arranged in the wellbore 104 where the array 202 has been replaced by a single detector 204. In this example, a collimator 218 may be arranged around the single detector 204 for azimuthal sensitivity. It should be appreciated that the source may also be collimated or may be collimated instead of the detector 204. Accordingly, as described above, in various embodiments measurements may be conducted where different regions of the detector are collimated. However, eccentricity, as shown in FIG. 2D may still be recognized by an increased count rate when a region closer to the formation is exposed to receive measurement data.

Figure 3A:
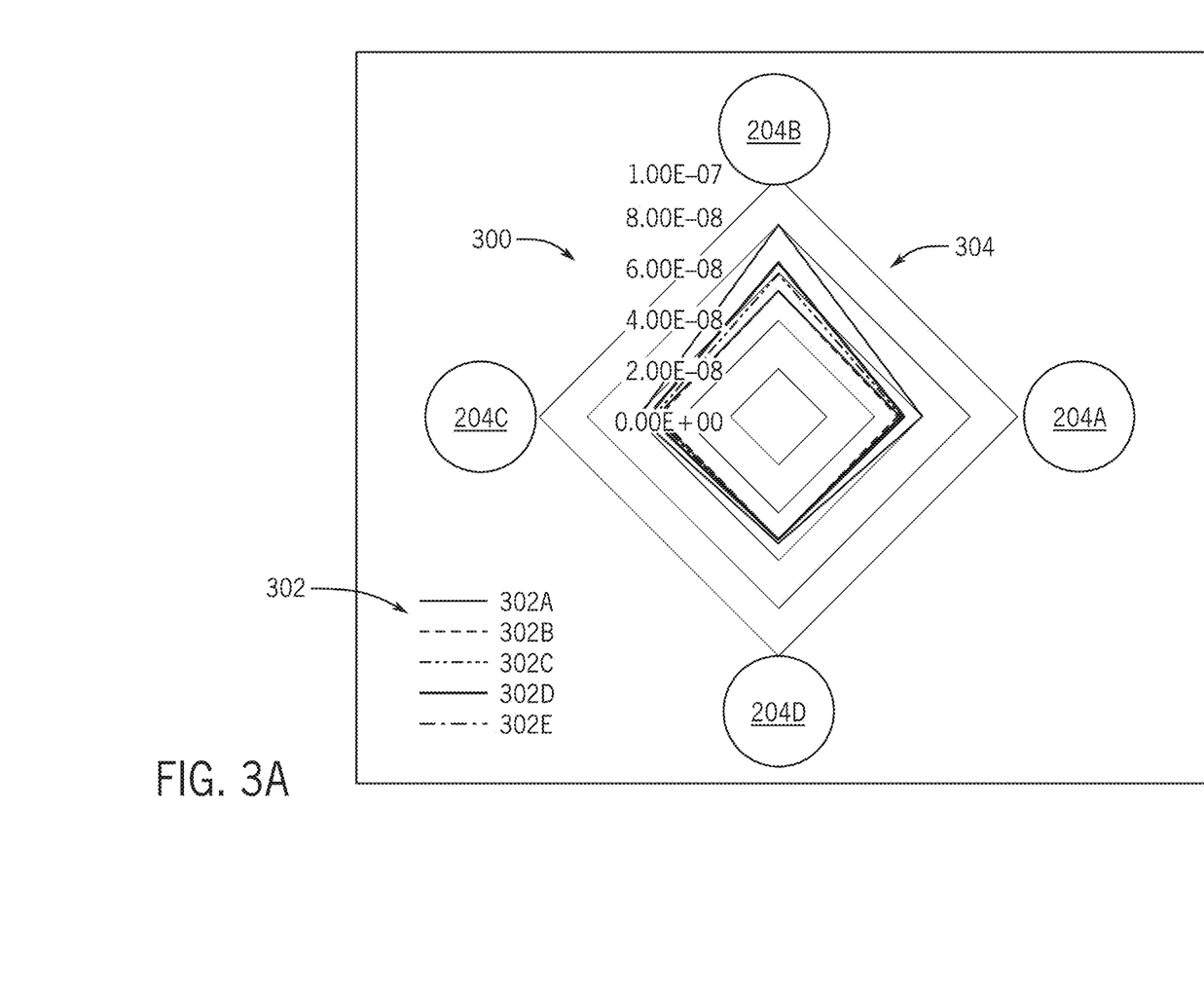
FIGS. 3A and 3B are graphical representations of embodiments of neutron responses for wellbore tools, in accordance with embodiments of the present disclosure.

FIG. 3A is a graphical representation of a neutron response 300 for a tool, such as the tool 102, that is arranged in an eccentric position within a wellbore and/or for a tool within an eccentric tubular. As noted above, eccentric positions of the tool and/or tubular may lead to identifiable features within the response that correspond to eccentricities, as opposed to other wellbore features or properties, and may be utilized with embodiments of the present disclosure to quantitatively evaluate multiple measurements from different measurement modalities.

In the illustrated embodiment, respective detectors 204 are arranged in different quadrants or vertices, but it should be appreciated that there may be more or less than 4 detectors 204 in other embodiments. As an illustration of the position of the detectors 204, a first detector 204A is arranged at the 0 degree vertex, a second detector 204B is arranged at the 90 degree vertex, a third detector 204C is arranged at the 180 degree vertex, and a fourth detector 204D is arranged at the 270 degree vertex. It should be appreciated that this illustration is not necessarily the actual position of the detectors 204 within the tool 1004, but rather, intended to illustrate the response 300 with respect to each detector in terms of counts received at the detectors 204. As will be described below, the neutron response 300 may be indicative of counts illustrated for the different detectors 204A-204D, which may be indicative of eccentricity, for example, because a detector closer to a tubular may receive more counts than another detector.

In the illustrated embodiment, different plots 302 are illustrated as substantially rectangular shaped plots. The plots include respective vertices at the differ vertexes corresponding to a number of counts, which in this embodiment, align with the detectors 204. For example, a first plot 302A illustrates a substantially equal count for each of the detectors 204A-204D. In other words, the shape of the first plot 302A is substantially square or diamond-shaped, illustrating that a substantially equal number of counts is recorded at each detector 204. However, as additional plots 302B-302E are recorded, it can be seen that counts are increased with respect to the second detector 204B at the 90 degree vertex. For example, the fifth plot 302E has significantly more counts at the second detector 204B than at the first detector 204A. Accordingly, as will be described below, this increase in counts may be determined a feature of interest 304 (e.g., feature, neutron feature, counting feature, etc.) with respect to one or more downhole properties, which may include eccentricity. It should be appreciated that increased count rates between adjacent detectors is one example of a feature of interest, but others may also be utilized. By way of example, in various embodiments, a high count rate of a detector could be caused by instrument errors or the like. Moreover, a count rate difference between those of two neighboring detector may be not sufficiently large because neutron measurement is volumetric measurement. Accordingly, it should be appreciated that filtering or a rules based analysis may be utilized to determine the feature of interest.

Figure 3B:
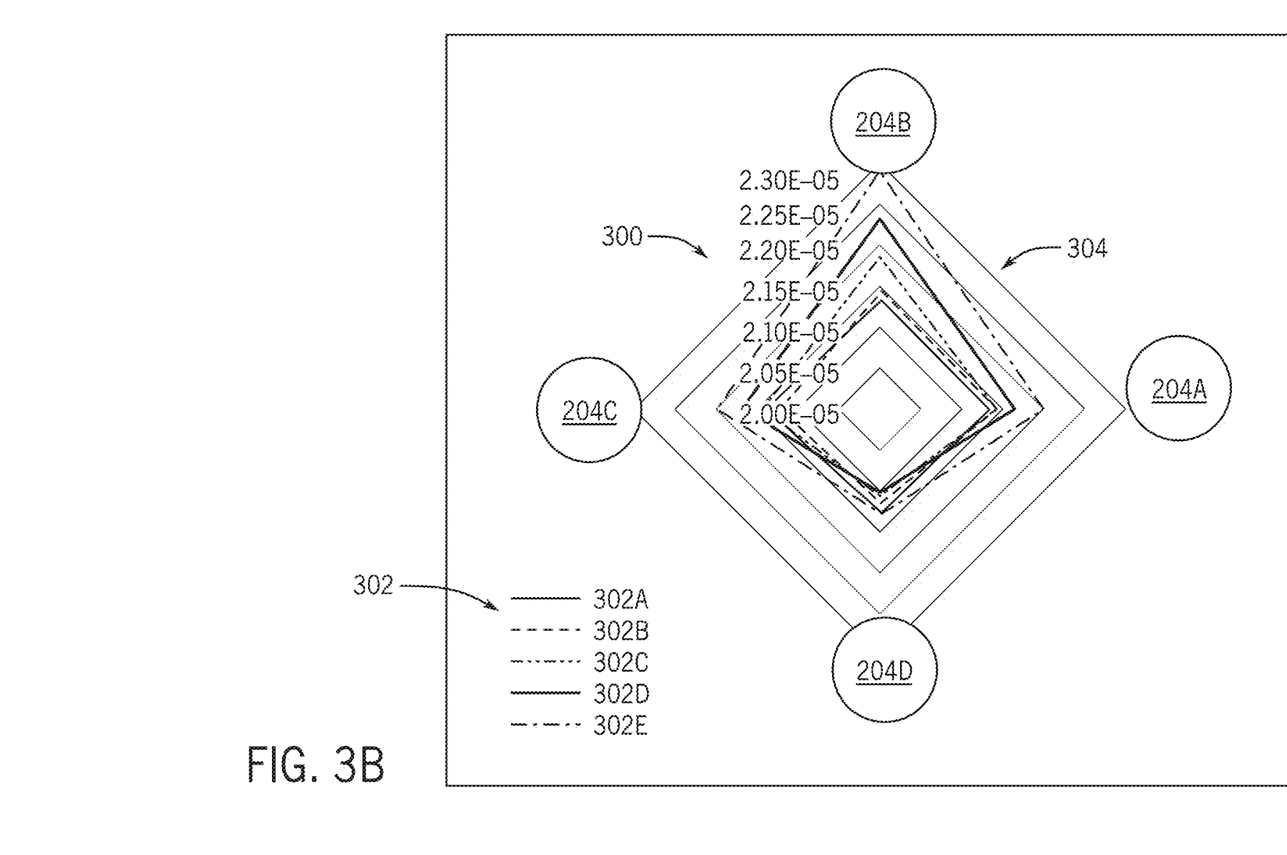

The illustrated embodiment in FIG. 3A corresponds to a thermal gate neutron measurement. FIG. 3B illustrates a graphical representation of the neutron response 300 in the burst gate. As shown, the sensitivity to the feature 304 is increased when compared to the plots of FIG. 3A. In this embodiment, the first, second, third, and fourth detectors 204A-204D are positioned at their respective vertices, along with the plots 302A-302E illustrating counts for the respective detectors. Again, the first plot 302A shows a fairly uniform response. However, the third plot 302C through the fifth plot 302E illustrate the increased count rates at the second detector 204B, which may be indicative of eccentricity. As will be described, the feature 304 identified via the plots 302A-302E may be compared to data obtained from different measurement modalities with known tubing deviations and then a cross correlation coefficient may be utilized in order to identify the deviation of the tubing and/or tool. In various embodiments, the sensitivity of burst gate measurements to the tubing deviation is higher than that of thermal gate measurements to tubing deviation. However, the thermal gate measurements may provide better sensitivity to the azimuthal location of flaws in cement annulus.

As noted above, embodiments of the present disclosure may replace the array 202 with a single detector 204. Accordingly, rather than evaluations of different detectors 204A-204D arranged at the vertices, evaluation may be based on a position of the collimator 218 to determine an azimuthal sensitivity for the detector 204, which may change based on eccentricity.

Figure 4:
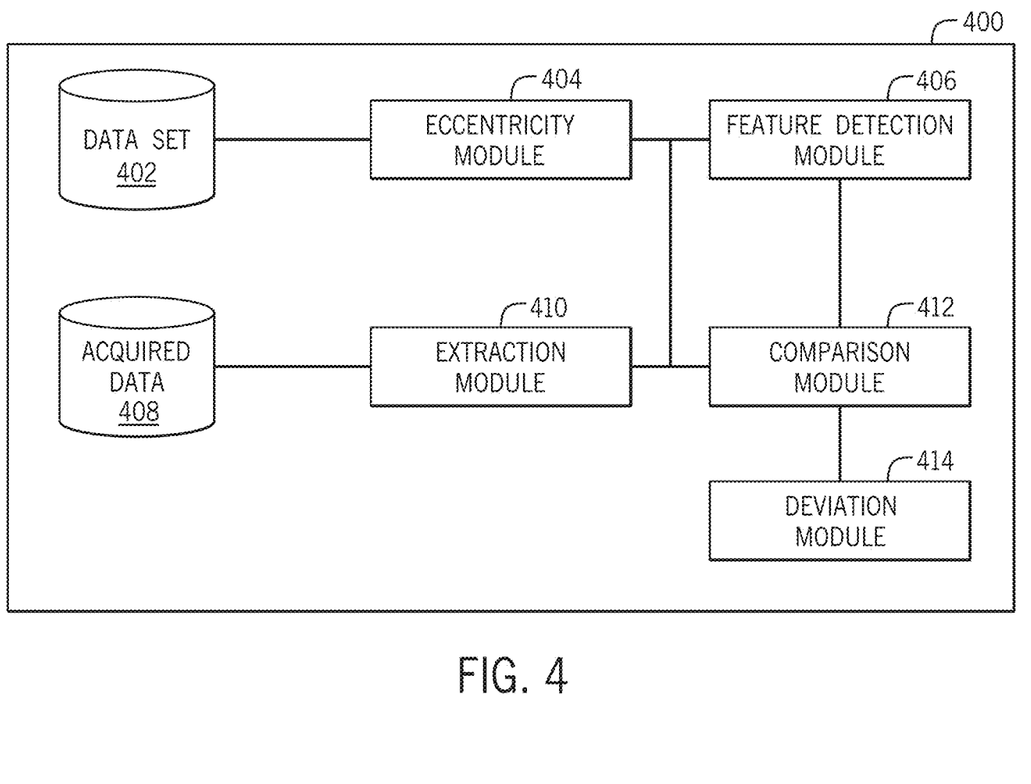
FIG. 4 is a schematic diagram of a deviation determination environment, in accordance with embodiments of the present disclosure.

FIG. 4 is a schematic diagram of an environment 400 that may be utilized to determine tube and/or tool deviation, based at least in part on a pattern matching process to evaluate a detected feature obtained from a neutron measurement. It should be appreciated that the environment 400 may include software modules stored on one or more memories that are executed by one or more processors. It should be appreciated that the modules may be part of different systems or memory devices that are coupled together, for example via the internet or using a distributed computing system. Furthermore, the one or more modules may be positioned on the downhole tool or associated with an uphole controller.

The illustrated environment 400 includes a data set database 402, which may correspond to data received from one or more measurement modalities. In various embodiments, the data set includes information utilized to determine deviation and/or eccentricity from a modality that is different from the nuclear measurements described herein. By way of example, EM may be utilized to determine eccentricity, as discussed above. However, it should be appreciated that the data set database 402 may be updated as new information is obtained to include nuclear measurement information. For example, over time, different jobs may utilize embodiments of the present disclosure to determine eccentricity using neutron measurement modalities. As a result, that information may be added to the data set database 402 to facilitate more robust pattern matching and/or analysis.

Further illustrated in the environment 400 is an eccentricity module 404. In various embodiments, the eccentricity module 404 analyses information from the data set database 402 to determine tube and/or tool eccentricity. For example, the data from the EM tool may be evaluated to determine deviated tools and/or tubulars, such as comparing different responses to determine differences indicative of tool and/or tubular deviation. As a result, a set of known deviated portions, and their associated signals, may be identified using the eccentricity module 406.

In this embodiment, a feature detection module 406 is utilized to detect patterns in the responses indicative of the eccentricities identified by the eccentricity module 404. By way of example, the patterns may refer to certain responses or differences between areas of tubing that are concentric (or substantially concentric) compared to areas that are deviated. The features may be isolated over a certain range or segment length (e.g., depth), thereby providing improved detection characteristics. In various embodiments, one or more rules may be established with respect to the features indicative of the eccentricity. For example, a response signal may differ from a surrounding signature by more than a certain percentage. Furthermore, in various embodiments, the feature detection module 406 may be used to evaluate differences between features indicative of a defect or other wellbore property and features indicative of tube and/or tool deviation. For example, in certain embodiments deviation may "control" or otherwise play a more prominent part in the signal than a defect or formation property, thereby enabling isolation and detection of features associated with deviations. Accordingly, the feature detection module may be utilized to analyze and detect different feature signatures from data inputs to determine whether characteristics of those features may be associated with deviations with respect to the tool and/or tubular.

It should be appreciated that the feature detection module may incorporate one or more machine learning systems in order to evaluate data to determine how responses are comparable to different elements of a downhole environment. By way of example only, a neural network may be utilized that uses training data for known feature signatures (e.g., eccentricity, cement defects, material loss, etc.) and classifies the responses based on that information. Thereafter, test data, for example simulated data, may also be utilized in order to further refine and improve the identification model. Thereafter, the system may be refined over time, for example as new data is acquired, where new information is used as additional training data for further refinements.

In various embodiments, a set of rules may be established that provide patterns that may be used to match to different segments of data to identify one or more wellbore properties, such as a tube and/or tool eccentricity. In this example, data from an acquired data database 408 may correspond to data obtained using one or more nuclear measurement modalities, such as the neutron detection measurements described above. The data may be referred to as "raw data" that may undergo one or more post or pre-processing steps, such as filtering, noise reduction, and the like. The acquired data, in certain embodiments, is evaluated and segmented into different subsets of data (e.g., regions or bins) using an extraction module 410. The extraction module 410 may identify various subsets of data within the acquired data for further evaluation via the feature detection module 406. For example, the feature detection module 406, as noted above, may evaluate different responses across the segments of the data to identify one or more features that may correspond to various wellbore properties, such as an indication of eccentricity. It should be appreciated that evaluation may also be performed to time bin ranges. For example, different portions of the wellbore may also correspond to different times and/or time bin ranges.

In the illustrated embodiment, a comparison module is utilized to compute cross correlation coefficients between the extracted pattern responses from the acquired data and the pattern responses identified by the feature detection module 406 for the data set with known tubing positions. By identifying a maximum coefficient, a tubing deviation may be calculated using the deviation module 412. In this manner, previously known data may be utilized for pattern matching to calculate a coefficient to enable determination of tubular and/or tool deviation.

As will be described below, in various embodiments, a pattern recognition algorithm may be utilized to identify an unknown tubing center position using neutron measurements. In various embodiments, a data set ($T_p$) is processed. This data set may be from the data set database 102, which may include information from previously determined wellbores where information has been processed and utilized to identify a tool and/or tubular. In various embodiments, the data set is in the form of a time domain spectrum and may include neutron detector data. However, it should be appreciated that data sets including information from other measurement modalities may also be utilized. The measurements are provided at $N_p$ different deviated positions in the borehole, without cement defects, and may be represented as $$\{m_{n,j}^{perf}(t_k), n=1,2,\ldots,N_p, j=1,2,\ldots,J_D, k=1,2,\ldots K_t\}, \quad (1)$$

where $t_k$ is the kth time bin, n is sequential number of measurements, and j is the sequential number of detectors. Additionally, as noted above with respect to the acquired data, a test data set (e.g., the acquired data set) T of time domain spectrum measurements may be utilized. The data set may include data acquired via a neutron detector cluster with unknown tubing positions in the borehole and unknown cement defects, and may be represented as $$\{m(t_k)_{i,j}, i=1,2,\ldots,I_m, j=1,2,\ldots,J_D, k=1,2,\ldots K_t\}, \quad (2)$$

where i is sequential number of measurements. In various embodiments, pattern recognition may be utilized to identify various features that may correspond to one or more properties, such as defects and/or eccentricities. As noted above, the known dataset $T_p$ may be used to acquire these signatures for pattern matching. Extracted pattern responses may be represented by $R_p$ and includes data corresponding to tubing at different known deviated positions in the borehole and no cement defect, which may be represented as $$\{R_{n,j}^{perf}, n=1,2,\ldots,N_p, j=1,2,\ldots,J_D\} \quad (3)$$

The pattern may be extracted by summing over responses in a selected range of measurements for each detector with known tubing positions, as illustrated in Equation (4).

$$R_{n,j}^{perf} = \sum_{k=k_{init}}^{k=k_{final}} \ln[m_{n,j}^{perf}(t_k)], \quad (4)$$

$$n = 1, 2, \ldots, N_p, j = 1, 2, \ldots, J_D$$

Pattern responses may similarly be extracted from different unknown deviated tubing positions in the borehole with unknown cement defects, for example from the data set T, which may be presented as $$\{R_{i,j}, i=1,2,\ldots,I_M, j=1,2,\ldots,J_D\}. \quad (5)$$

The pattern may be extracted by summing over responses in a selected range of measurements for each detector with unknown tubing positions, as illustrated in Equation (6)

$$R_{i,j} = \sum_{k=k_{init}}^{k=k_{final}} \ln[m_{i,j}(t_k)], \quad (6)$$

$$i = 1, 2, \ldots, I_M, j = 1, 2, \ldots, J_D$$

The identified patterns may then be utilized to determine one or more cross correlation coefficients $\rho_{i,n}$, between the extracted pattern response of the ith measurement of neutron detectors with unknown tubing position and the pattern responses of neutron detectors with known tubing deviation positions. In other words, pattern matching may be utilized in order to identify similar responses of which the correlations between neutron data and deviation are known. Computation of the cross correlation coefficients is illustrated in Equation (7). For example, a neutron measurement counter may be set to i=1 to begin the computation.

$$\rho_{i,n} = \frac{\sum_{j=1}^{J_D} R_{i,j} R_{n,j}^{perf}}{\sqrt{\sum_{j=1}^{J_D} (R_{i,j})^2} \sqrt{\sum_{j=1}^{J_D} (R_{n,j}^{perf})^2}}, n = 1, 2, \ldots, N_p \quad (7)$$

In various embodiments, a number of cross correlations may be determined and may then be parsed and/or ranked to identify a maximum $\rho_{i,max}$ of the cross correlation coefficient sequence, represented as $$\{\rho_{i,n}, n=1,2,\ldots,N_p\} \quad (8)$$

where the vertical bar represents an evaluation at the maximum value in the sequence. This maximum cross correlation coefficient sequence may then be used to determine the corresponding tubing deviation, represented as $$r_{dev}|_{\rho_{i,max}} \quad (9)$$

Subsequently, embodiments include setting the searched solution of tubing deviation for the ith measurement of neutron detectors, as shown below $$r_{dev,i} = r_{dev}|_{\rho_{i,max}} \quad (10)$$

The measurement counter may then be updated (e.g., i=i+1) and may be continued until $>I_M$.

Figure 5:
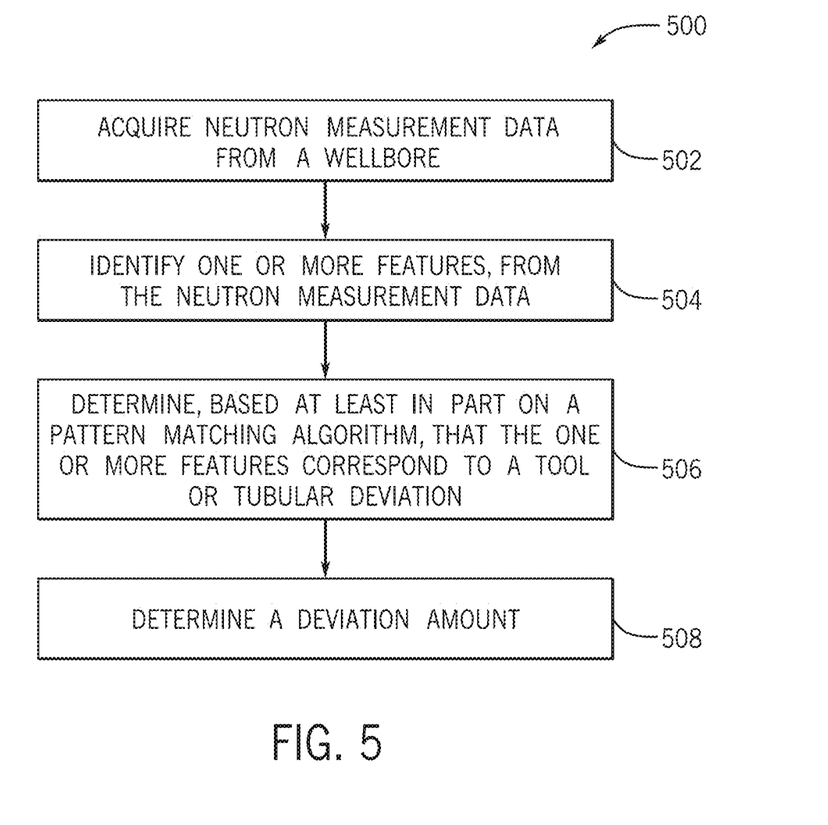
FIG. 5 is a flow chart of an embodiment of a method for determining a deviation for a tool and/or tubular, in accordance with embodiments of the present disclosure.

FIG. 5 is a flow chart of an embodiment of a method 500 for determining a tubing deviation. It should be appreciated that for this method, and all other methods described herein, that there may be more or fewer steps. Furthermore, the steps may be performed in a different order, or in parallel, unless otherwise stated. In this example, neutron measurement data is acquired from a wellbore 502. For example, a nuclear measurement system may be deployed that emits neutrons into a formation where one or more detectors receive and record a spectrum. The acquired data may be processed to identify one or more features 504. In various embodiments, the features may correspond to changes in counting statistics (e.g., more or fewer counts) as well as a presence of neutrons within particular energy ranges. In certain embodiments, the one or more features may be indicative of eccentricity and/or deviations. The method may include determining that the one or more features correspond to a tool and/or tubular deviation 506. For example, a pattern matching algorithm may be used to identify and features at one or more depths along the wellbore indicative of an eccentricity or deviation. For example, the pattern matching algorithm may use known information to evaluate certain neutron response signals that correspond to various types of features, including eccentricity. Accordingly, the features of the acquired data may also be evaluated using the matching algorithm to identify features that correspond to eccentricity. In various embodiments, a deviation amount or quantity is also determined 508. For example, the pattern matching algorithm may be utilized to compute a cross correlation coefficient that may be applied to the measurement data to determine an offset, for example an offset from a wellbore axis to a tool axis. Accordingly, this information may be utilized to adjust various components of the measurement data to account for the eccentricity.

Figure 6:
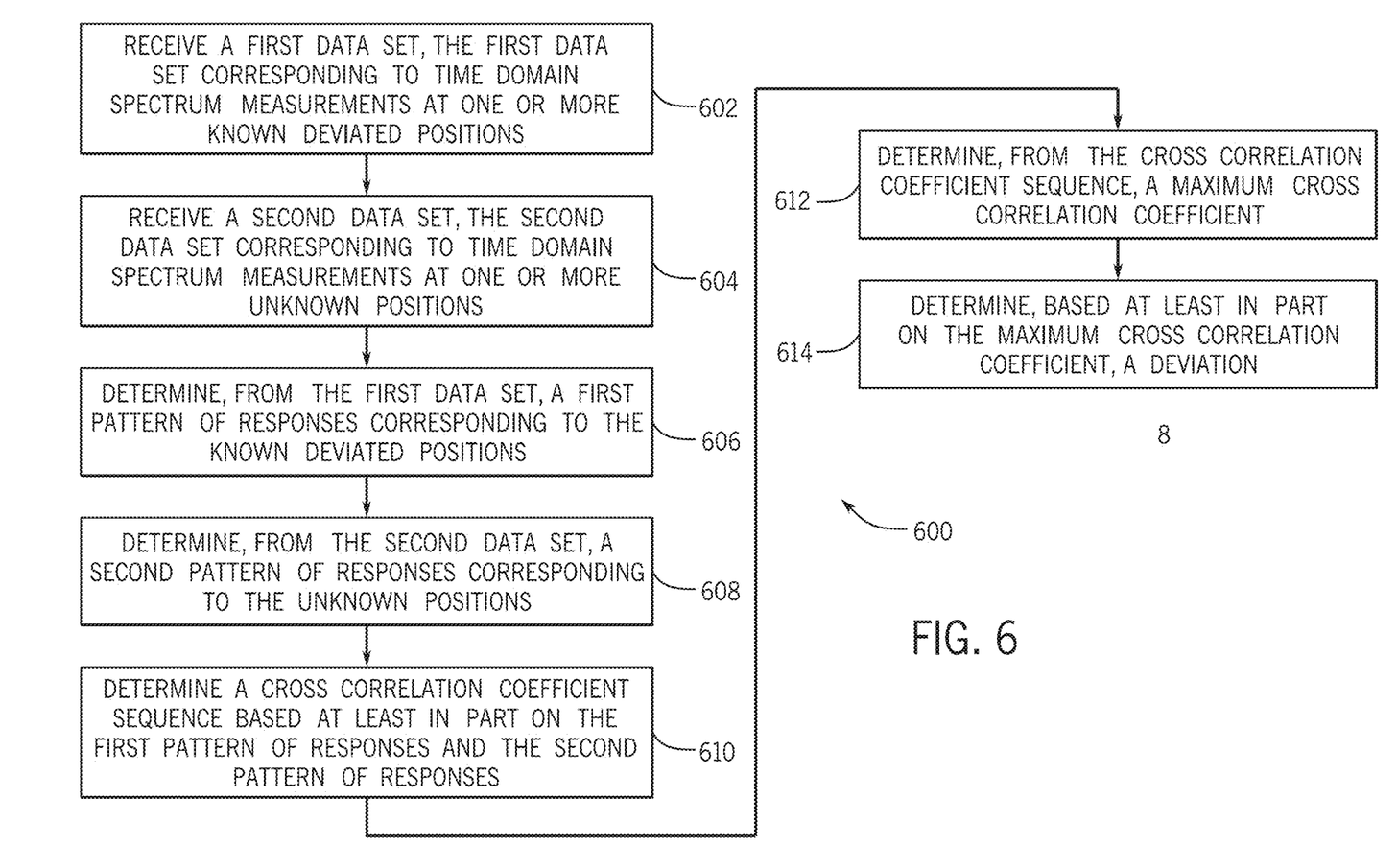
FIG. 6 is a flow chart of an embodiment of a method for determining a deviation for a tool and/or tubular, in accordance with embodiments of the present disclosure.

FIG. 6 is a flow chart for an embodiment of a method 600 for determining a deviation between a tubular and/or tool in a wellbore. In this example, a first data set is acquired 602. In various embodiments, the first data set corresponds to a time domain spectrum including measurement data at known deviated positions. As noted above, the first data set may correspond to previously obtained and verified data and/or test data. It should be appreciated that this information may be acquired through downhole measurements, simulated data, or from a server or memory that stores previously acquired data. A second data set corresponding to a second time domain spectrum is also acquired 604. The second data set may include unknown positions. That is, the second data set may be an acquired data set being evaluated to identify features indicative of deviations.

In various embodiments, a first pattern of responses is identified within the first data set 606. For example, the data set may be evaluated to correlate the data response with the known deviation positions. These may correspond to bins or segments of the data, which may be correlated to depth of the wellbore, to provide an indication on a shape or behavior of the spectrum with respect to deviations. By way of example, a count rate may increase for one detector from a detector array and significantly decrease for an opposite detector, which may be indicative of eccentricity toward the detector with the higher count rate. Furthermore, in embodiments, a second pattern of responses is identified within the second data set 608. By way of example, the pattern of responses may correspond to one or more features, which may be determined and/or selected based on a set of rules, such as a count rate above a threshold, a count rate compared to adjacent segments, and/or the like.

In embodiments, a cross correlation coefficient sequence is calculated based at least in part on the first pattern of responses and the second pattern of responses 610. As described above, the cross correlation coefficient may evaluate differences between the extracted pattern responses at a first position and iterate through various different positions. Different positons may provide a different coefficient along the sequence, which may be evaluated to find a maximum value 612 and applied to the second data set to determine a deviation 614. In this manner, known data may be evaluated against unknown data to determine a correlation between signal responses. A difference may be computed to determine a correction factor for determining a deviation of the tool and/or tubular at different locations along the wellbore.

The foregoing disclosure and description of the disclosed embodiments is illustrative and explanatory of various embodiments of the present disclosure. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A method for determining a tubing deviation from nuclear measurement data, comprising:
   acquiring neutron measurement data from a wellbore;
   identifying one or more features from the neutron measurement data;
   determining, based at least in part on a pattern matching algorithm, that the one or more features are indicative of a tubular deviation; and
   determining, based at least in part on a comparison between the one or more features, a deviation amount.

2. The method of claim 1, wherein the one or more features are represented by an increased neutron count rate.

3. The method of claim 2, wherein the increased neutron count rate is attributed to a first detector of an array of detectors, the increased neutron count rate being a threshold quantity greater than a count rate of an adjacent detector of the array of detectors.

4. The method of claim 1, further comprising:
   determining a cross correlation coefficient, the cross correlation coefficient based at least in part on an evaluation between a known deviation position from a first data set and an unknown deviation position from the acquired neutron measurement data.

5. The method of claim 1, wherein the neutron measurement data corresponds to data acquired in a burst gate.

6. The method of claim 1, wherein the neutron measurement data corresponds to data acquired in a thermal gate.

7. The method of claim 1, further comprising:
   extracting, from the neutron measurement data, one or more data segments, the data segments corresponding to subsets of data associated with the one or more features.

8. A method for determining a deviation from nuclear measurement data, comprising:
   receiving a first data set, the first data set including first time domain spectrum measurements with a first set of bins corresponding to respective known deviated positions;
   receiving a second data set, the second data set including second time domain spectrum measurements with a second set of bins corresponding to respective unknown deviated positions;
   determining, from the first data set, a first response pattern for the respective known deviated positions;
   determining, from the second data set, a second response pattern for the respective unknown deviated positions;
   determining, based at least in part on the first response pattern and the second response pattern, a cross correlation coefficient between the first response pattern and the second response pattern; and
   determining, based at least in part on the cross correlation coefficient, respective deviations for the respective unknown deviated positions.

9. The method of claim 8, further comprising:
   determining, based at least in part on the first response pattern and the second response pattern, a cross correlation coefficient sequence.

10. The method of claim 9, further comprising:
    selecting, from the cross correlation coefficient sequence, a maximum cross correlation coefficient.

11. The method of claim 8, wherein at least one of the first response pattern or the second response pattern corresponds comprises a plurality of features identifiable by an increased neutron count rate.

12. The method of claim 8, wherein the second data set is compiled from a plurality of neutron detectors deployed in an array on a downhole tool.

13. The method of claim 8, wherein the second data set corresponds to data acquired in at least one of a burst gate or a thermal gate.

14. The method of claim 8, wherein the second data set corresponds to data acquired during a preselected time window.

15. A system for determining a deviation within a wellbore, comprising:
- a neutron generator forming at least a first portion of a downhole tool;
- a neutron detector forming at least a second portion of a downhole tool;
- a control system having a memory and a processor, the processor storing instructions that, when executed by the processor, cause the processor to:
  - acquire neutron measurement data from a wellbore;
  - identify one or more features from the neutron measurement data;
  - determine, based at least in part on a pattern matching algorithm, that the one or more features are indicative of at least one of a tool or a tubular deviation; and
  - determine, based at least in part on a comparison between the one or more features, a deviation amount.

16. The system of claim 15, wherein the one or more features are represented by an increased neutron count rate.

17. The system of claim 15, further comprising:
an array of neutron detectors, the array including the neutron detector, wherein an increased neutron count rate is attributed to at least one detector of the array of neutron detectors, the increased neutron count rate being a threshold quantity greater than a count rate of an adjacent detector of the array of detectors.

18. The system of claim 15, wherein the instructions, when executed by the processor, cause the processor to:
determine a cross correlation coefficient, the cross correlation coefficient based at least in part on an evaluation between a known deviation position from a first data set and an unknown deviation position from the acquired neutron measurement data.

19. The system of claim 15, wherein the neutron measurement data corresponds to data acquired in a burst gate.

20. The system of claim 15, wherein the neutron measurement data corresponds to data acquired in a thermal gate.

* * * * *